(12) United States Patent
Linstead et al.

(10) Patent No.: US 12,197,375 B2
(45) Date of Patent: Jan. 14, 2025

(54) SYNCHRONOUS/ASYNCHRONOUS NETWORK COMMUNICATIONS LAYER

(71) Applicant: Dell Products L.P., Round Rock, TX (US)

(72) Inventors: Paul A. Linstead, Shrewsbury, MA (US); Doug E. Lecrone, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 18/104,872

(22) Filed: Feb. 2, 2023

(65) Prior Publication Data

US 2024/0264968 A1 Aug. 8, 2024

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............. G06F 13/4208; G06F 13/4221; G06F 13/4234; G06F 13/4247; G06F 2213/0008; G06F 2213/0026

USPC ............................................ 710/5, 7, 20, 21
See application file for complete search history.

(56) References Cited

U.S. PATENT DOCUMENTS

| 2017/0097780 A1* | 4/2017 | Craddock | ........... G06F 13/1668 |
| 2024/0172189 A1* | 5/2024 | Xie | ........................ H04W 4/80 |

FOREIGN PATENT DOCUMENTS

KR          100715981 B1  *  5/2007

* cited by examiner

*Primary Examiner* — Ilwoo Park
(74) *Attorney, Agent, or Firm* — Krishnendu Gupta; Nikhil Patel

(57) ABSTRACT

One or more aspects of the present disclosure relate to establishing and using a hybrid synchronous/asynchronous communication layer for input/output (IO) messages to a storage array. In embodiments, an input/output (IO) message can be modified into first and second IO portions. In addition, a network communications layer can be established to include synchronous and asynchronous channels. Further, the first IO portion can be transmitted over the synchronous channel, and the second IO portion can be transmitted over the asynchronous channel.

20 Claims, 4 Drawing Sheets

SYNCHRONOUS/ASYNCHRONOUS NETWORK COMMUNICATIONS LAYER

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to establishing and using a hybrid synchronous/asynchronous communication layer for input/output (IO) messages to a storage array. In embodiments, an input/output (IO) message can be modified into first and second IO portions. In addition, a network communications layer can be established to include synchronous and asynchronous channels. Further, the first IO portion can be transmitted over the synchronous channel, and the second IO portion can be transmitted over the asynchronous channel.

In embodiments, the first IO portion can be provided with control information corresponding to the modified IO message.

In embodiments, memory management instructions corresponding to the second IO portion can be established. Further, the memory management instructions can be included in the control information.

In embodiments, the second IO portion can be provided with an access request corresponding to the IO message.

In embodiments, a read IO request can be generated. Additionally, the accessing request can be established to include the read IO request.

In embodiments, a hybrid synchronous/asynchronous communications path can be established over a storage area network (SAN) using the network communications layer.

In embodiments, the network communications layer can be established with protocols and instructions to enable a concurrent transmission of the first and second IO portions over the hybrid synchronous/asynchronous communications path.

In embodiments, a peripheral component interconnect express (PCIe) connection can be established with one or more devices on the SAN for a synchronous communications channel of the hybrid synchronous/asynchronous communications path.

In embodiments, a fiber connection (FICON) can be established with one or more devices on the SAN for an asynchronous communications channel of the hybrid synchronous/asynchronous communications path.

In embodiments, the first and second IO portions can be established with temporal markings to ensure a target device corresponding to the modified IO message synchronously processes the first and second IO portions.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
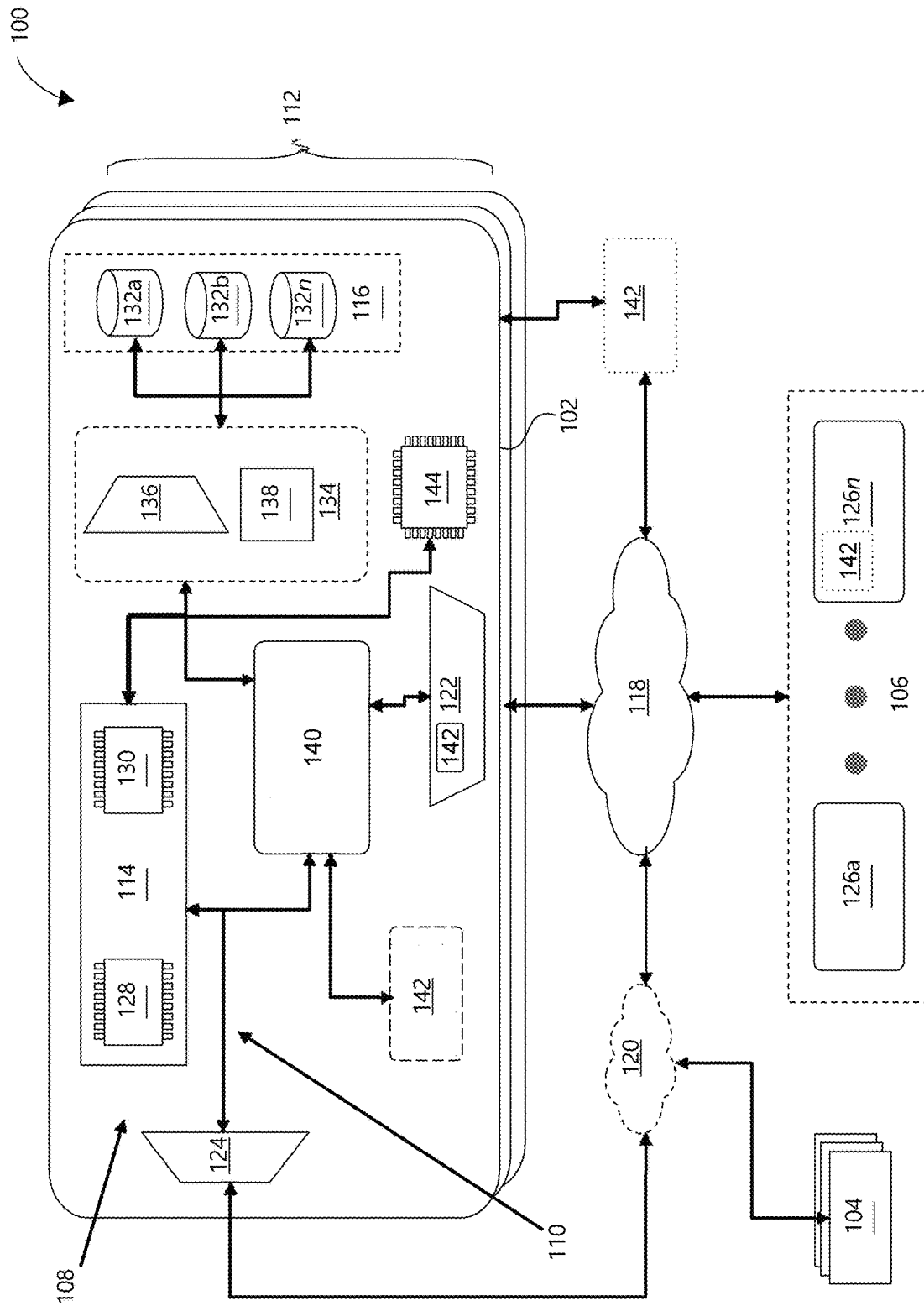
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes the storage array 102 and one or more other storage arrays.

In embodiments, the storage array 102, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multiprocessor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that controls access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

In embodiments, a host client machine (e.g., client machine 126n) can include the controller 142. When included in a client machine, the controller 142 can include logic and circuitry configured to perform network communication services over, e.g., the network 118. For example, the controller 142 can establish a hybrid synchronous/asynchronous path between the hosts 106 and the storage array 102 via network 118.

Figure 2:
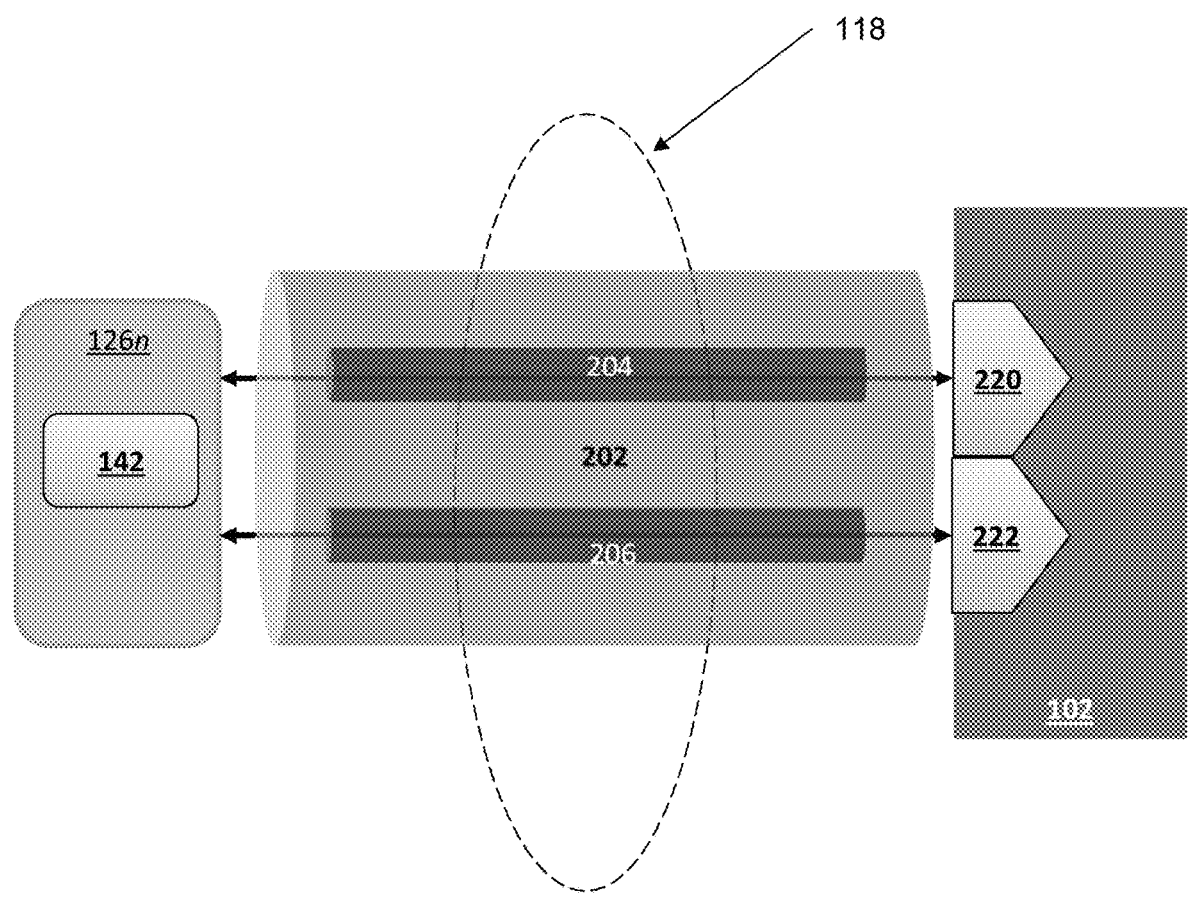
FIG. 2 is a block diagram of a hybrid synchronous/asynchronous communications path in accordance with embodiments of the present disclosure.

Regarding FIG. 2, a host client machine 126n can include a controller 142 (e.g., a network controller) that establishes a network communications layer configured to transmit/receive messages to devices connected to a network 118 (e.g., a SAN). For example, a networked device can include a storage array 102.

In embodiments, the network communications layer can include a hybrid synchronous/asynchronous communication layer that includes protocols to establish a hybrid synchronous/asynchronous communications path between devices connected to the SAN. Accordingly, the controller 142 can establish a hybrid synchronous/asynchronous communications path 202 (hybrid path) between the host client machine 126n and the storage array 102. For example, the hybrid path 202 can be established with a synchronous channel 204 and an asynchronous channel 206. Further, the controller 142 can connect the synchronous channel to the storage array 102 via a peripheral component interconnect express (PCIe) connection 220. Additionally, the controller 142 can connect the asynchronous channel to the storage array 102 via a fiber connection (FICON) 222.

In embodiments, the hybrid synchronous/asynchronous communication layer can include protocols and instructions that enable a concurrent transmission of portions of an IO message over the synchronous channel 204 and the asynchronous channel 206, as described in greater detail below.

Currently, host client machines use naïve IO transmission techniques that experience unnecessary latencies. For example, storage arrays can use memory management techniques that pre-cache data corresponding to forecasted IO read requests. For example, the memory management techniques can use machine learning (ML) methods to identify IO read request patterns. Further, memory management techniques can identify "hot" and "cold" data using the IO request patterns. Thus, the memory management technique can pre-cache "hot" data from persistent storage into the storage array's global memory. For example, "hot" data can correspond to data with IO requests greater than a threshold frequency. In contrast, "cold" data corresponds to data with IO requests less than the threshold.

Thus, IO requests corresponding to "cold" data are not pre-cached in the storage array's global memory, requiring the storage array to retrieve the "cold" data from its persistent storage. However, retrieving data from persistent storage 116 introduces latencies in IO response times. As described in greater detail below, embodiments of the present disclosure use, e.g., the hybrid path 202 of FIG. 2, to eliminate such latencies.

Figure 3:
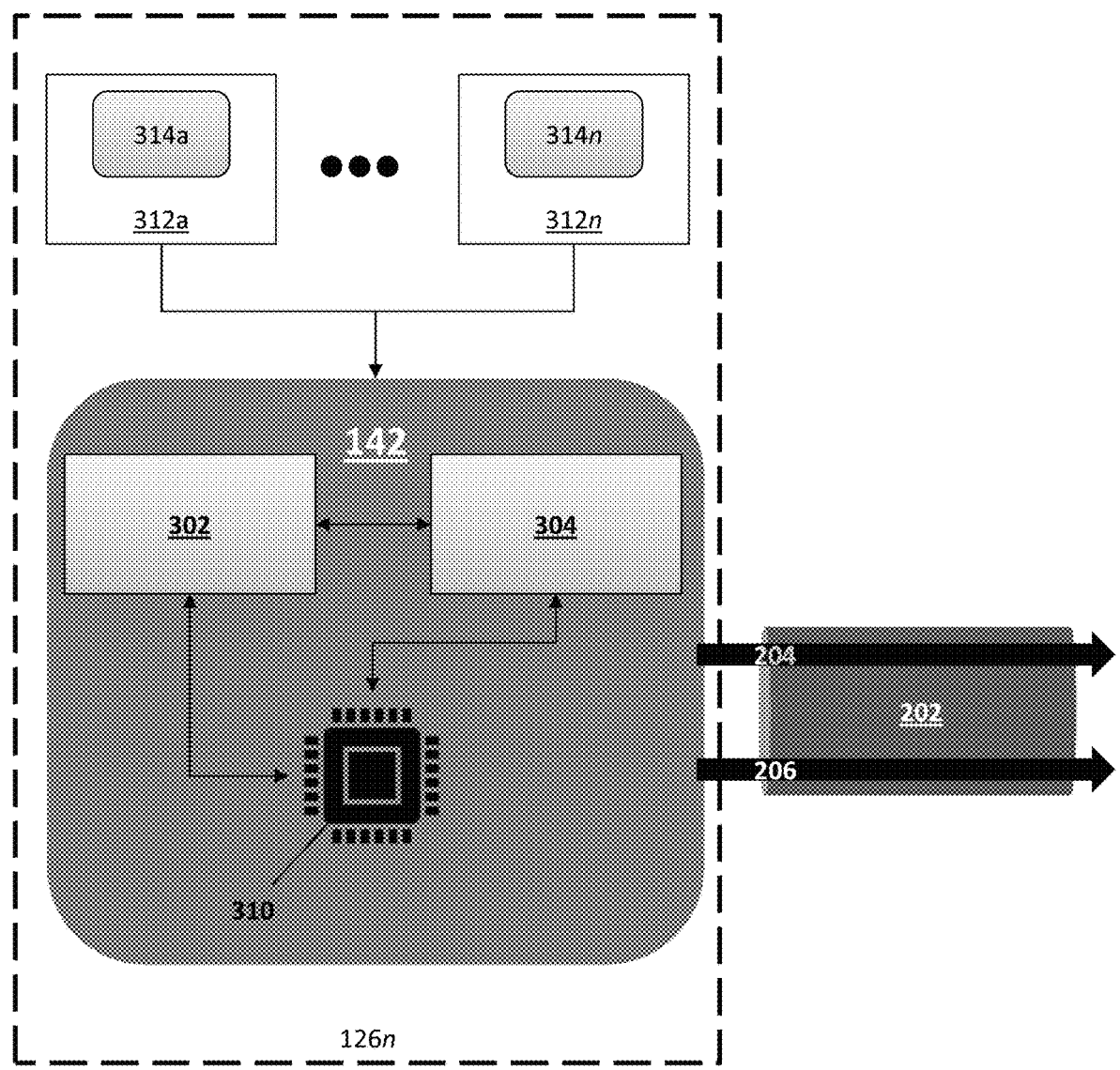
FIG. 3 is a block diagram of a network controller in accordance with embodiments of the present disclosure.

Regarding FIG. 3, a host client machine 126*n* can include one or more virtual machines (VMs) 312*a-n* that host and run applications 314*a-n*, respectively. For example, a user device like a laptop (not shown) can access the host client machine 126*n* to access a business application (e.g., application 314*a*) hosted by the VM 312*a*. Accordingly, the application 314*a* can require data managed by the storage array 102 of FIG. 1. Thus, the application 314*a* can generate an IO read request to access the data from the storage array 102.

In embodiments, the host client machine 126*n* can include a network controller 142 that intercepts and modifies the IO message for transmission to the storage array 102 via a hybrid synchronous/asynchronous communications path 202. For example, the network controller 142 can include an IO processor 302 that splits the IO message into first and second IO portions.

For example, the IO processor 302 can parse the IO message's metadata and payload to identify virtual storage information corresponding to, e.g., a virtual location of the IO message's read data request. For example, the virtual location can include a logical unit number (LUN) and track identifier (TID), amongst other related virtual location information. Additionally, the IO processor 302 can parse the IO message to extract its read request payload.

In embodiments, the IO processor 302 can generate a control message (e.g., first IO portion) based on the virtual storage and location information. For example, the control message can include memory management instructions that enable the storage array to pre-cache data corresponding to the IO message from persistent storage. Additionally, the IO processor 302 can generate an access request message (e.g., the second IO portion) using the extracted read request. Further, the IO processor 302 can provide the control and access request messages with pairing metadata, identifying their relationship.

In embodiments, the network controller 142 can include a network adapter 304 that packages the control and access request messages for transmission to the storage array 102 via the hybrid path 202. For example, the network adapter 304 can include synchronous transmission metadata in the control message's package using the hybrid synchronous/asynchronous communication layer's protocols. Likewise, the network adapter 304 can include asynchronous transmission metadata in the access request message's package. Further, the network adapter 304 can provide each package with temporal markings. Accordingly, the network adapter 304 can contemporaneously transmit the control and access request messages to the storage array 102. Specifically, the network adapter 304 transmits the control message over a synchronous channel 204 and the access request message over an asynchronous channel of the hybrid path 202.

Due to the inherent nature of synchronous communications, the storage array 102 receives the control message before its corresponding access request message. Thus, the storage array 102 can advantageously pre-cache data from persistent storage corresponding to the target read data of the access request message. Accordingly, the storage array 102 can immediately fulfill the read request once it receives the access request message.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
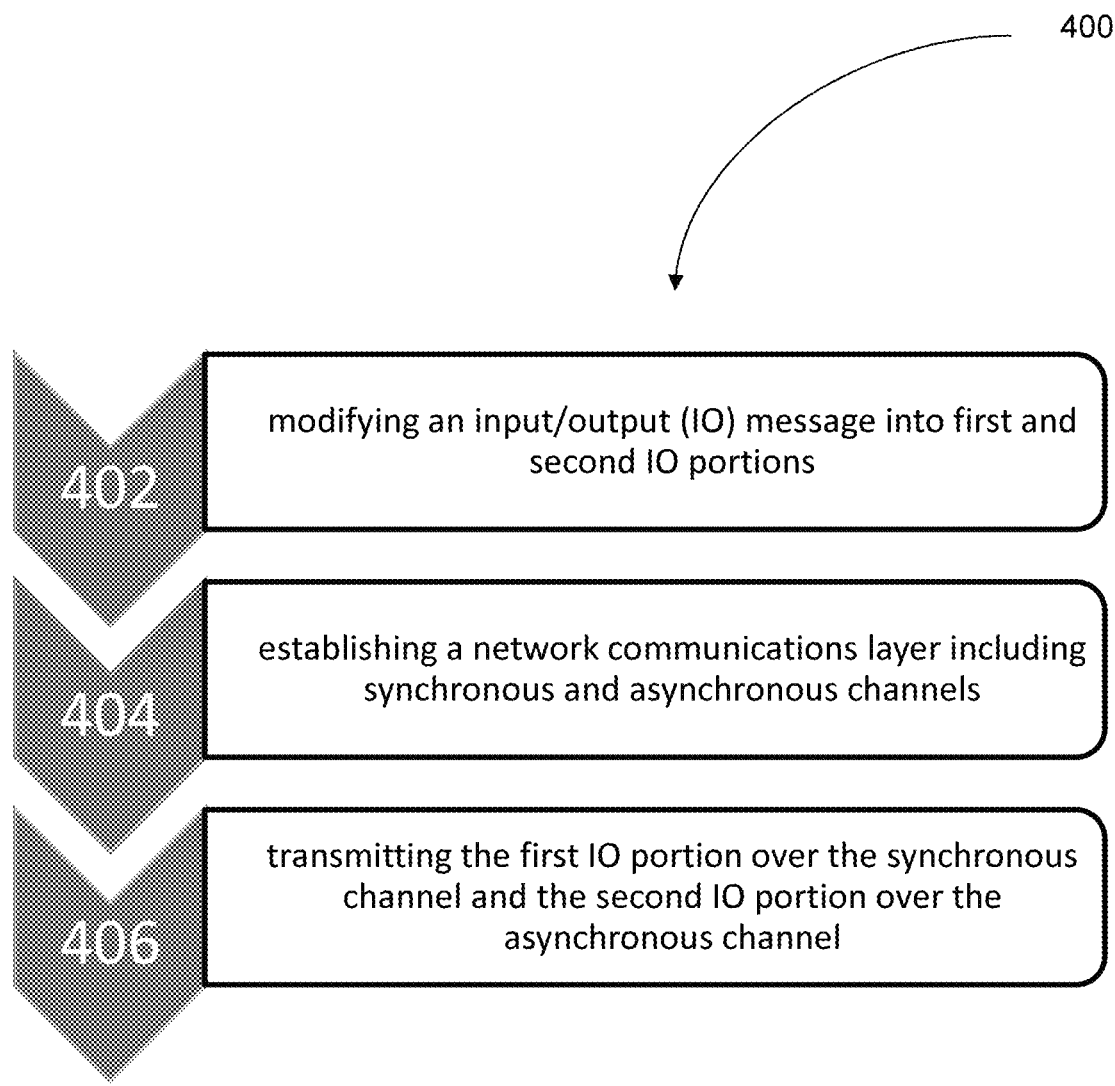
FIG. 4 is a flow diagram of a method that relates to establishing and using a hybrid synchronous/asynchronous communication layer for input/output (IO) messages to a storage array per embodiments of the present disclosure.

Regarding FIG. 4, a method 400 relates to establishing and using a hybrid synchronous/asynchronous communication layer for input/output (IO) messages to a storage array. In embodiments, the controller 142 of FIG. 1 can perform all or a subset of operations corresponding to method 400.

For example, the method 400, at 402, can include modifying an input/output (IO) message into first and second IO portions. Additionally, at 404, the method 400 can include establishing a network communications layer, including synchronous and asynchronous channels. Further, the method 400, at 406, can include transmitting the first IO portion over the synchronous channel and the second IO portion over the asynchronous channel.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
modifying an input/output (IO) message into first and second IO portions;
establishing a network communications layer including synchronous and asynchronous channels;
transmitting the first IO portion over the synchronous channel and the second IO portion over the asynchronous channel;
providing the first IO portion with control information corresponding to the modified IO message, wherein the control information includes memory management instructions corresponding to the second IO portion; and
configuring the first and second IO portions with temporal markings to ensure a target device corresponding to the modified IO message synchronously processes the first and second IO portions.

2. The method of claim 1, further comprising:
providing the first IO portion with control information corresponding to the modified IO message.

3. The method of claim 2, further comprising:
establishing memory management instructions corresponding to the second IO portion; and
including the memory management instructions in the control information.

4. The method of claim 1, further comprising:
providing the second IO portion with an access request corresponding to the IO message.

5. The method of claim 4, further comprising:
generating a read IO request; and
establishing the accessing request to include the read IO request.

6. The method of claim 1, further comprising:
establishing a hybrid synchronous/asynchronous communications path over a storage area network (SAN) using the network communications layer.

7. The method of claim 6, further comprising:
providing the network communications layer with protocols and instructions to enable a concurrent transmission of the first and second IO portions over the hybrid synchronous/asynchronous communications path.

8. The method of claim 6, further comprising:
establishing a peripheral component interconnect express (PCIe) connection with one or more devices on the SAN for a synchronous communications channel of the hybrid synchronous/asynchronous communications path.

9. The method of claim 1, further comprising:
establishing a fiber connection (FICON) with one or more devices on the SAN for an asynchronous communications channel of the hybrid synchronous/asynchronous communications path.

10. The method of claim 1, further comprising:
configuring the first and second IO portions with temporal markings to ensure a target device corresponding to the modified IO message synchronously processes the first and second IO portions.

11. A system with a memory and a processor, the system configured to:
modify an input/output (IO) message into first and second IO portions;
establish a network communications layer including synchronous and asynchronous channels;
transmit the first IO portion over the synchronous channel and the second IO portion over the asynchronous channel;
provide the first IO portion with control information corresponding to the modified IO message, wherein the control information includes memory management instructions corresponding to the second IO portion; and
configure the first and second IO portions with temporal markings to ensure a target device corresponding to the modified IO message synchronously processes the first and second IO portions.

12. The system of claim 11, further configured to:
provide the first IO portion with control information corresponding to the modified IO message.

13. The system of claim 12, further configured to:
establish memory management instructions corresponding to the second IO portion; and
include the memory management instructions in the control information.

14. The system of claim 11, further configured to:
provide the second IO portion with an access request corresponding to the IO message.

15. The system of claim 14, further configured to:
generate a read IO request; and
establish the accessing request to include the read IO request.

16. The system of claim 11, further configured to:
establish a hybrid synchronous/asynchronous communications path over a storage area network (SAN) using the network communications layer.

17. The system of claim 16, further configured to:
provide the network communications layer with protocols and instructions to enable a concurrent transmission of the first and second IO portions over the hybrid synchronous/asynchronous communications path.

18. The system of claim 16, further configured to:
establish a peripheral component interconnect express (PCIe) connection with one or more devices on the SAN for a synchronous communications channel of the hybrid synchronous/asynchronous communications path.

19. The system of claim 11, further configured to:
establish a fiber connection (FICON) with one or more devices on the SAN for an asynchronous communications channel of the hybrid synchronous/asynchronous communications path.

20. The system of claim 11, further configured to:
configure the first and second IO portions with temporal markings to ensure a target device corresponding to the modified IO message synchronously processes the first and second IO portions.

* * * * *